Oct. 30, 1962     H. E. SCHMITT     3,060,679
POWERPLANT
Filed Oct. 24, 1958
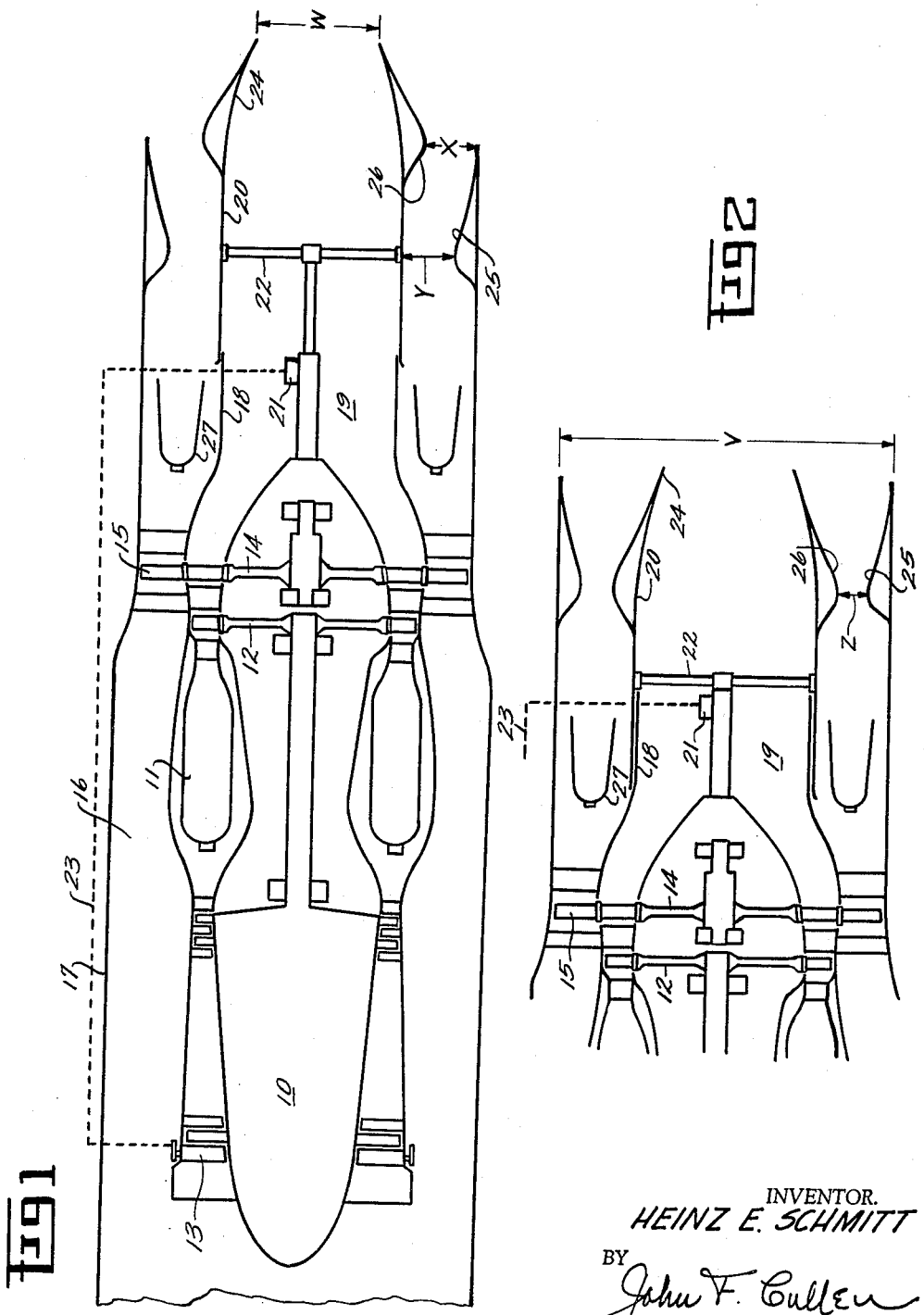
INVENTOR.
HEINZ E. SCHMITT
BY John F. Cullen
ATTORNEY

United States Patent Office 3,060,679
Patented Oct. 30, 1962

3,060,679
POWERPLANT
Heinz E. Schmitt, Cincinnati, Ohio, assignor to General Electric Company, a corporation of New York
Filed Oct. 24, 1958, Ser. No. 769,489
6 Claims. (Cl. 60—35.6)

The instant invention relates to a reaction powerplant and, more particularly, to a high Mach powerplant for operation over a wide speed range.

In supersonic powerplants, such as those designed to operate over a range from Mach 0 to Mach 4 and up, the conventional practice is to design the powerplant for the highest flight speed for which it will be used, which is normally called the design point, or design speed. Since the vehicle with which the powerplant is associated is often required to be self-accelerating, that is, it starts from a stationary position and accelerates to design speed, it follows that a good part of its operation and performance occurs below the design point flight speed. This creates problems since the best design characteristics for the high flight speed or the designed flight speed are different from those desired below the design speed. Problems are created at both the inlet and outlet or nozzle of such reaction powerplants.

The conventional way of handling the inlet is to design it with external compression so that the unwanted air is spilled around the inlet at the lower flight speeds and is swallowed by the inlet at the high flight speeds.

In the case of the exit or the nozzle, a converging-diverging jet nozzle with a large maximum area is desired at the high speed design point in order to achieve maximum thrust. However, this area is usually far too large for reduced flight speeds because the flow passing through the engine or powerplant will not fill up the exit area at the low speeds. The result is an overexpansion of the fluid and poor nozzle performance at low flight speed. One solution to this problem to avoid thrust losses caused by inefficient performance at low speeds has been to use a less efficient nozzle at the design point in order to favor the low flight speed performance. Another solution, which introduces complexities in the hardware required, has been to physically reduce the maximum area of the jet nozzle.

Such a powerplant, which has to operate over a range from Mach 0 to Mach 4 and above, needs a jet nozzle able to perform well enough at pressure ratios between 1.6 to 75 and more. The pressure ratio is the ratio of the pressure in a jet nozzle upstream of the throat of the nozzle to the ambient pressure. At the critical pressure ratio, which is the ratio for sonic velocity in the throat, a converging nozzle is required whereas above the critical ratio, a convergent-divergent nozzle is required. Stated simply, efficient subsonic operation requires a convergent nozzle whereas efficient supersonic operation requires a convergent-divergent nozzle. However, an additional limitation is required wherein the area of the nozzle throat has to be reduced at the high Mach operation because of the mass flow and pressure ratio relations in regard to the high Mach number. The pressure goes up much faster than the mass flow at the Mach numbers. Thus, there is a smaller volume per pound of air so a smaller throat area is required to pass it efficiently. Because of these conditions, complex hardware is normally required in order to reduce the throat area and still provide a convergent-divergent nozzle at the high Mach speeds and increase the throat area and provide a convergent nozzle at the low speeds in order to provide efficient operation over the complete flight speed range. In some design speed cases, it is desirable to reduce the throat area to as little as one-third what it would be at the low Mach operation, in order to obtain good cruise performance. It is difficult to meet these conditions in a simple design and avoid complex hardware.

The present disclosed powerplant is a high Mach reaction powerplant that is designed to operate efficiently over a wide speed range from Mach 0 to Mach 4 and above, and to operate efficiently throughout the speed range with relatively simple hardware in the nozzle area to obtain the convergent large area nozzle at the lower ranges and the convergent-divergent small area nozzle at the high speed ranges plus additional advantages.

The main object of the invention is to provide such a powerplant that is efficiently operable over a wide speed range with simple and few hardware parts.

A further object is to provide such a powerplant which uses substantially conventional elements arranged in a novel combination to provide for the wide range of efficient operation.

Another object is to provide such a powerplant wherein the nozzle hardware is so arranged that an unusually wide area variation is obtainable, such area variation in the illustrated embodiment being as high as three to one.

Briefly stated, the powerplant consists of a gas generator which may comprise the usual components such as compressor, combustion chamber, and turbine all exhausting into a ducted converging plug nozzle which may be fixed or variable. Surrounding the plug nozzle is a separate by-pass duct which, with the plug nozzle, forms a separate nozzle in the by-pass duct for the separate by-pass stream. Movement of either the plug nozzle or the casing forming the outer portion of the by-pass duct provides the area variation and the converging or converging-diverging nozzle configuration.

While the specification concludes with claims particularly pointing out and distinctly claiming the subject matter which I regard as my invention, it is believed the invention will be better understood from the following description taken in connection with the accompanying drawing in which:

FIGURE 1 is a general schematic view of the overall powerplant set for operation in the low Mach speed range; and, FIGURE 2 is a partial view of the powerplant showing the nozzle configuration set for operation in the high Mach speed range.

It is important to note that, while the invention is shown as a combination turbo-ramjet engine in employing a conventional axial compressor, combustor and turbine, all of which comprise the gas generator portion of the powerplant, that any suitable gas generating means may be used and the illustrated embodiment is merely a preferred execution of the invention.

As shown in FIGURE 1, the powerplant comprises a compressor 10, a combustor section 11 and a turbine 12 all in the conventional manner in which the turbine 12 drives the compressor 10. Forward of the compressor 10 are inlet control vanes 13 to control the air admission to the compressor from full on to full off as will be apparent as the description proceeds. The powerplant is illustrated with a coaxial free turbine 14 having turbine blades thereon driven by the exhaust from the gas generator and having fan blades 15 mounted on the periphery of the turbine buckets, the fan blades extending into a by-pass duct 16 formed by casing 17 extending around an inner casing 18 and preferably concentric therewith. Obviously, the free turbine and fan shown for illustration only could be omitted. The inner casing 18 forms an exhaust gas passage 19 from the gas generator portion of the powerplant to exhaust through a ducted plug nozzle 20, the duct portion forming part of the exhaust passage in the tailpipe of the powerplant.

The term "ducted plug nozzle" is intended to describe a nozzle of the type shown wherein the exhaust gases are discharged centrally through a duct 19 of a conventional type plug nozzle. In order to provide axial movement to the ducted plug nozzle 20, it is preferably arranged in telescopic relation with casing 18 and movement is obtained by means of actuator 21 operating through suitable linkage 22. The movement may be obtained in many ways, the illustration being a simple embodiment. Coordination between the movement of the ducted plug nozzle and the inlet control vanes 13 is insured by linkage 23 which may take any suitable form.

The ducted plug nozzle, in order to provide efficient operation and thrust at the low speed extended downstream position shown in FIGURE 1, is arranged to form a converging nozzle 24 which is preferably a fixed outlet nozzle but may be variable if desired by any conventional means. The present invention is shown as a fixed area nozzle.

In order to provide additional thrust, the separate casing 17 forming the by-pass duct 16 is designed to take in ambient air with the assistance of free turbine 14 operating on fan blades 15 and directing ambient air into the by-pass duct. At high flight speeds, the free turbine 15 will windmill as will be seen.

In order to provide a nozzle in the by-pass portion, annular inwardly directed nozzle means 25 arranged on the downstream portion of casing 17 cooperates with the outwardly directed plug portion 26 of plug nozzle 20. For additional thrust, combustion means 27 for adding heat energy may be provided in the by-pass duct if required.

It can be seen, by reference to FIGURE 1, that the by-pass nozzle configuration formed by cooperating means 25 and 26 is a converging nozzle for operation at the low Mach numbers since the area at X is smaller than the area at Y.

Since the ducted plug nozzle is pulled to a retracted upstream position at the high Mach operation as seen in FIGURE 2, the throat area Z is now at a minimum which is the desired condition. At the same time, it is to be noted that the length of the combustion area between combustion means 27 and the nozzle is short. The advantage of this is that if the inner plug nozzle portion 20 is made the retractable member and is then retracted for minimum area, the outer casing 17 may be made short resulting in a weight saving which is important in any aircraft design. Retraction of the plug upstream by linkage 22 simultaneously closes down inlet guide vanes 13 until, in the fully retracted position of FIGURE 2, the vanes are closed and the powerplant operates as a ram jet through the by-pass duct 16. While the axial movement is desired on the inner plug nozzle as shown, it will be apparent that the outer casing 17 could be made movable and the inner portion held fixed. However, for the advantages just described, the preferred arrangement is as shown in FIGURE 2.

Referring again to FIGURE 1, the selected configuration of the nozzle is shown as it appears in the low speed or sub-sonic operation range. The extension of the plug nozzle to the downstream position shown provides a convergent nozzle in the by-pass portion and the larger throat area as shown at X. At the same time, in the low speed range where combustion is most difficult, an additional advantage is obtained in that length is added to the combustion chamber by movement of the center body or plug downstream as shown. Since combustion conditions are critical, this arrangement is important in saving length especially on the outer shell 17 where it is important with respect to weight reduction. Thus, where the combustion is difficult in the low speed range, additional length is added as shown in FIGURE 1 to the combustion area and this combustion length is reduced in the high speed area as shown in FIGURE 2 where combustion problems are not as difficult but the same portion of the casing is then used as the divergent part of the nozzle.

In operation of the disclosed powerplant over the Mach range intended, the two ends of the operational range are shown in FIGURES 1 and 2. As illustrated in FIGURE 1, at take-off or low Mach flight, the gas generator is operated at full speed and maximum temperature driving the fan 15. The guide vanes 13 are open and the center body or ducted plug nozzle is in the downstream position shown. The temperature in the fan flow may be raised by the addition of energy by combustion of fuel introduced into the air flow by combustion means 27 and controlled by suitable means so that the air flow, pressure, temperature and throat area of the nozzle are properly matched. By separation of the two streams, the center stream and the by-pass stream, both streams produce thrust, as shown, the internal flow in the center body or plug nozzle 20 is only restricted by the fixed exit area converging nozzle 24.

At Mach numbers between 2 and 3, it becomes desirable to reduce the speed of the gas generator because of the high compressor inlet temperature due to ram air. This is done by reducing the fuel flow to the gas generator combustor 11 until it is cut off entirely. As soon as the fuel is cut off, the inlet control vanes 13 are turned to closed position to prevent air reaching the gas generator. Thus, the entire air flow is now in the by-pass duct 16 and through the annular by-pass nozzle formed by members 25 and 26. The overall throat area of the whole nozzle exit has been reduced by the area W of the exit at the end of the center plug nozzle as a result of closing the inlet to the gas generator. Thus, the sole flow is now through the by-pass duct and nozzle in the form of a ramjet, and the exit area X may be only two-thirds of the combined low speed area, X plus W, depending on the fan by-pass ratio which mainly determines the ratio of X/W. This could be 2 to 1.

Hence, blocking the compressor inlet by vanes 13 directs the flow into the by-pass duct and the entire flow now passes through the throat area X which is only two-thirds of the whole area X plus W. Thus, closing the inlet guide vanes achieves a throat area reduction without the movement of any nozzle parts.

To further reduce the throat area for hi-Mach operation, and, simultaneously obtain a sufficiently large expansion ratio for good efficiency, the center duct plug nozzle is retracted to the FIG. 2 position wherein the throat area X is now reduced to Z while the exit area becomes V. It can be seen that such reduction, if vanes 13 are not completely closed, increases the back pressure to also reduce the air intake to the gas generator and thus control air admission.

Thus, the required reduction in throat area of one-third or less of the low speed area is obtained, and the exit area V is the maximum area obtainable. Normally, such area variations would necessitate complicated hardware.

As soon as the compressor inlet is closed, the fan will windmill since there is no gas to drive it. However, for cooling purposes, a small air flow might be allowed to pass through the gas generator if desired. Since the inlet air is cut off at the high flight speeds to operate the powerplant like a ramjet, the gas generator does not have to operate at the high inlet temperature associated with high Mach flight and therefore does not have to be designed to withstand the temperatures normally associated with high Mach flight.

The disclosed powerplant then provides an efficiently operating reaction engine for a wide range of flight speeds and with relatively simple nozzle construction in combination with the ducted plug. It permits the wide area variation while at the same time providing the converging nozzle for the low speeds and the converging-diverging nozzle for the high speeds.

I claim:

1. A reaction powerplant comprising gas generator means, means controlling the admission of air to the gas generator from full on to full off, an inner casing forming an exhaust gas passage from the gas generator to atmosphere to provide propulsive thrust, said passage including a ducted plug nozzle as part thereof and having an outwardly directed portion thereon, an outer casing surrounding said inner casing forming a bypass duct therewith separate from said exhaust gas passage to avoid mixing, inwardly directed nozle means on said outer casing cooperating with said outwardly directed portion on said plug nozzle to form a by-pass nozzle, at least one of said casings being moveable axially to vary the configuration of the by-pass nozzle from converging to converging-diverging, means connecting said control means and said moveable casing to vary air admission to the gas generator from full on when the by-pass nozzle is in the converging configuration, and energy adding means in said by-pass duct to full off when the by-pass nozzle is in the converging-diverging configuration.

2. A reaction powerplant comprising, gas generating means, means controlling the admission of air to the gas generator from full on to full off, an inner casing forming an exhaust gas passage from the gas generator to atmosphere to provide propulsive thrust, said passage including a ducted plug nozzle as part thereof and having an outwardly directed portion thereon, the ducted part of the plug forming a converging nozzle, an outer casing surrounding and spaced from said inner casing forming a by-pass duct therewith separate from said exhaust gas passage to avoid mixing, annular inwardly directed nozzle means on said outer casing cooperative with said outwardly directed portion on said plug nozzle to form a by-pass nozzle, at least one of said casings being moveable axially to vary the configuration of the by-pass nozzle from converging to converging-diverging, means connecting said control means and said moveable casing to vary air admission to the gas generator from full on when the by-pass nozzle is in the converging configuration to full off when the by-pass nozzle is in the converging-diverging configuration and energy adding means in said by-pass duct.

3. A reaction powerplant comprising, gas generating means, means controlling the admission of air to the gas generator from full on to full off, an inner casing forming an exhaust gas passage from the gas generator to atmosphere to provide propulsive thrust, said passage including a ducted moveable plug nozzle connected with said inner casing for telescopic movement therewith between a retracted upstream position and an extended downstream position, said plug nozzle having a portion thereon extending outwardly from said inner casing, an outer casing concentric with and spaced from said inner casing forming a by-pass duct therewith separate from said exhaust gas passage to avoid mixing, annular inwardly directed nozzle means on said outer casing cooperating with said outwardly extending portion of said plug nozzle to form a converging-diverging by-pass nozzle when said plug nozzle is in retracted position and a converging by-pass nozzle when said plug is in extended position, means connecting said control means and said moveable plug nozzle to close off admission of air to the gas generator when said plug nozzle is in the retracted position, and energy adding means in said by-pass duct.

4. Apparatus as described in claim 3 wherein the ducted portion of the plug nozzle forms a converging nozzle in the exhaust gas passage.

5. A reaction powerplant comprising, an axial flow turbojet, means controlling the admission of air to the turbojet from full on to full off, a ducted plug nozzle mounted on the tail pipe of the turbojet for axial movement thereon, said nozzle having an outwardly directed portion thereon, the exhaust gases passing through the center of said ducted nozzle to provide propulsive thrust, a concentric casing around said turbojet forming a by-pass duct therewith separate from said exhaust gas passage to avoid mixing, a free fan coaxial with said turbojet and operative in said by-pass duct, nozzle means formed on the inner surface of said casing and extending inwardly therefrom to cooperate with said outward portion of said plug nozzle to form a by-pass nozzle, said inwardly extending nozzle means and outwardly directed portion of said plug nozzle forming a converging by-pass nozzle when said plug is in an extended downstream position and forming a converging-diverging by-pass nozzle when said plug is in a retracted upstream position, means connecting said control means and said plug nozzle to close off admission of air to the turbojet when said plug is in the retracted position, and energy adding means in said by-pass duct.

6. Apparatus as described in claim 5 wherein the ducted portion of the plug nozzle forms a converging nozzle at the downstream end thereof.

References Cited in the file of this patent

UNITED STATES PATENTS

| | | |
|---|---|---|
| 2,570,629 | Anxionnaz | Oct. 9, 1951 |
| 2,672,726 | Wolf et al. | Mar. 23, 1954 |
| 2,696,078 | Waitzman | Dec. 7, 1954 |
| 2,850,873 | Hausmann | Sept. 9, 1958 |
| 2,909,894 | O'Donnell | Oct. 27, 1959 |
| 2,955,414 | Hausmann | Oct. 11, 1960 |

FOREIGN PATENTS

| | | |
|---|---|---|
| 50,033 | France | Aug. 1, 1939 |
| | (3rd addition to 779,655) | |
| 772,363 | Great Britain | Apr. 10, 1957 |
| 1,028,513 | France | Feb. 25, 1953 |
| 1,094,635 | France | Dec. 8, 1954 |